(12) United States Patent
Sun et al.

(10) Patent No.: US 8,774,644 B2
(45) Date of Patent: Jul. 8, 2014

(54) PMD AND CHROMATIC DISPERSION TOLERANT CLOCK RECOVERY

(75) Inventors: Han Henry Sun, Ottawa (CA); Kuang-Tsan Wu, Kanata (CA)

(73) Assignee: Infinera Corporation, Sunnyvale, CA (US)

( * ) Notice: Subject to any disclaimer, the term of this patent is extended or adjusted under 35 U.S.C. 154(b) by 242 days.

(21) Appl. No.: 13/037,315

(22) Filed: Feb. 28, 2011

(65) Prior Publication Data

US 2012/0219302 A1    Aug. 30, 2012

(51) Int. Cl.
*H04B 10/06* (2011.01)

(52) U.S. Cl.
USPC ............................. 398/202; 398/203; 398/204

(58) Field of Classification Search
USPC .................................................. 398/202–214
See application file for complete search history.

(56) References Cited

U.S. PATENT DOCUMENTS

| | | | |
|---|---|---|---|
| 7,532,822 B2 | 5/2009 | Sun et al. | |
| 2010/0329697 A1* | 12/2010 | Koizumi et al. | 398/208 |
| 2011/0229127 A1* | 9/2011 | Sakamoto et al. | 398/25 |
| 2012/0213510 A1* | 8/2012 | Stojanovic | 398/25 |
| 2013/0039665 A1* | 2/2013 | Hauske | 398/202 |

OTHER PUBLICATIONS

F. N. Hauske, et.al., "Impact of Optical Channel Distortions to Digital Timing Recovery in Digital Coherent Transmission Systems", ICTON 2010, We.D1.4.

M. Kuschnerov, et.al., "DGD-tolerant Timing Recovery for Coherent Receivers", 15th Optoelectronics and Communications Conference, Jul. 2010.

K. Roberts, et al, "Performance of dual-polarization QPSK for optical transport systems," JLT, vol. 27, No. 16, pp. 3546-3559, Aug. 2009.

Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.

F. Gardner, "A BPSK/QPSK Timing-Error Detector for Sampled Receivers", IEEE Trans. Comm., vol. I34, issue 5, 1986, p. 423-429.

(Continued)

*Primary Examiner* — Dzung Tran
(74) *Attorney, Agent, or Firm* — David L. Soltz

(57) ABSTRACT

Consistent with the present disclosure, a method and system for detecting a clock phase of an optical signal in a coherent receiver is provided that is insensitive to polarization mode dispersion (PMD) and other polarization effects in the optical communication system. The clock phase of the received signal is estimated by first calculating a phase shift between a pair of related frequency domain data outputs of a Fourier transform circuit. The calculated phase shift includes a phase component and a data spectrum component. The calculated phase shift is then averaged over a number of clock cycles to remove the data spectrum components thus enabling extraction of the phase component. A determinant function on the time averaged result is used to normalize any effects of PMD from the received signal and isolate the phase component. In this manner, the phase component is not dependent on the PMD effects in the optical communication system. The imaginary part of the phase component is then calculated to estimate the clock phase error which is used to tune an oscillator in the receiver to synchronize a sampling phase in the receiver with the received signal. An estimated value for the chromatic dispersion is determined from a resultant value of the determinant function and used to compensate for the effects of chromatic dispersion from the clock phase error estimate.

14 Claims, 7 Drawing Sheets

(56) References Cited

OTHER PUBLICATIONS

D. Godard, "Passband Timing Recovery in an All-Digital Modem Receiver", IEEE Comm., vol. 26, issue 5, 1978, p. 517-523.

K. Mueller, M. Muller, "Timing Recovery in Digital Synchronous Data Receivers", IEEE Trans. Comm., vol. com-24, No. 5, May 1976.

L.E. Franks, "Carrier and Bit Synchronization in Data Communication—A Tutorial Review", IEEE Trans. Comm., vol. com-28, No. 8, Aug. 1980.

J. Proakis, "Digital Communications", 2nd Edition, 1983, Ch. 4.5: Carrier and Symbol Synchronization.

S.J. Savory, et al, "Digital equalisation of 40Gbit/s per wavelength transmission over 2480 km of standard fibre without optical dispersion compensation," ECOC 2006, paper Th2.5.5.

H. Sun, et al, "Real-time measurements of a 40 Gb/s coherent system," Opt. Express 16, 2008, pp. 873-879.

* cited by examiner

PMD AND CHROMATIC DISPERSION TOLERANT CLOCK RECOVERY

BACKGROUND OF THE DISCLOSURE

Coherent optical communication systems have been developed that provide distinct advantages over more traditional direct detection schemes. In a coherent optical communication receiver, an optical signal is transmitted to a receiver, which converts the optical signal into corresponding electrical signals. The optical phase and amplitude of the transmitted optical signal are then detected based on the electrical signals, thus enabling the use of multilevel modulation schemes to increase optical fiber spectral efficiency. Coherent detection provides another advantage over direct detection in that linear impairments of the transmitted optical signal can be compensated for in the receiver using digital filters and other known digital compensation techniques that operate on the electrical signals associated with the received optical signals. Demodulation of the received optical signal is commonly performed using digital signal processing techniques in the receiver. In known systems these digital signal processing functions rely on clock phase/timing recovery of the received signal and synchronization of the receiver clock in order to accurately demodulate the received signal. Reliable and efficient clock phase recovery, however, is adversely affected by the degree of impairment and distortion of the received signal. Accordingly, in some known systems clock recovery cannot be performed until the impairments are compensated for in the receiver, which can be very difficult for large amounts of distortion resulting in unnecessary delay in initializing the receiver.

Some significant linear impairments and signal-distorting phenomena that can affect the performance of optical communication systems include chromatic dispersion (CD) and polarization mode dispersion (PMD). The transmitted optical signal has a finite spectral width such that the spectral components may be transmitted at different frequencies. Chromatic dispersion is a result of different spectral components of an optical signal propagating at different speeds along an optical fiber, resulting in an undesirable temporal spreading of the optical signal. PMD occurs due to the different polarization modes (X and Y polarization components) of the optical signal propagating along the fiber at different speeds and is caused by environmental effects and asymmetries in the optical fiber, which are often random, unpredictable and can vary over time. A differential group delay (DGD) describes the delay between the X and Y polarized signals as a result of the PMD effects in the optical fiber. Due to the random and unpredictable nature of PMD, PMD often cannot be easily determined or compensated for in a conventional optical communication system.

Optical communication systems generally include a number of links of optical fibers and optical system components, each contributing to the overall chromatic dispersion of the received signals. One conventional method of compensating for chromatic dispersion in an optical communication system includes the use of dispersion compensation fibers (DCFs) or other components that compensate for chromatic dispersion optically. In practice, however, implementing such DCFs and other known dispersion compensating techniques and components in the optical communication system undesirably increases the size and complexity of the system, and can be cumbersome and expensive. Additionally, such dispersion compensation components can undesirably limit the power and spectral efficiency of the optical communication system.

Recent advances in coherent receiver technology allow for compensation of linear transmission impairments, such as chromatic dispersion, by utilizing electronic dispersion compensation in the receiver instead of performing optical compensation using DCFs, such as those described above. Such electronic dispersion compensation operates on electrical signals generated in response to a received optical signal. One challenge related to these techniques, however, is that without the use of DCFs, a coherent optical receiver should be designed to compensate for a large chromatic dispersion, such as values as high as 51,000 ps/nm or higher. Another challenge is that since the received signal is affected by both chromatic dispersion and PMD, it is more difficult to singularly estimate the effects of either one. In conventional systems, discussed above, the chromatic dispersion is commonly compensated for first, or otherwise considered to be negligible, so that the PMD can be more accurately estimated at the receiver. In a system with potentially large chromatic dispersion and PMD, it is very difficult to accurately and efficiently estimate these effects in the receiver, thus seriously degrading performance of the optical communication system.

Some known methods for dealing with chromatic dispersion at the receiver utilize a preset or adaptive filter to compensate for a known chromatic dispersion. These solutions, however, are limited in that in many systems, especially switched systems in which the signal may travel via one of several different links, the chromatic dispersion effects cannot be easily known or determined in advance because each link scenario has a different chromatic dispersion, or the adaptive filter cannot be easily or efficiently updated.

In other known systems the chromatic dispersion may be estimated by iteratively scanning a range of chromatic dispersion values for the received signal over a number of steps and testing for each step whether satisfactory sensitivity is achieved in a control loop, such as an automatic gain control (AGC) loop or clock recovery loop. The scanning is performed by estimating a first value for the chromatic dispersion (such as 1000 ps/nm), calculating a chromatic dispersion coefficient, using the calculated chromatic dispersion coefficients in a compensation filter and evaluating the control loop response, then revising the estimate based on the control loop response. The range of the estimated chromatic dispersion values should be relatively narrow to minimize estimation error and ensure that the control loops achieve a desired sensitivity, that is, to ensure a clock recovery loop achieves a lock point such that the loop is stable. For example, the estimated chromatic dispersion value in each step should differ by 1000 ps/nm, or less, per step. To compensate for a chromatic dispersion of up to 50,000 ps/nm (from the above example), the scan may require approximately 50 steps or iterations. For each iteration, the step of calculating the chromatic dispersion coefficients results in even greater complexity. Additionally, there is added delay in such systems due to the time required for the acquired signal to be allocated for the chromatic dispersion scanning steps discussed above.

Additionally, the chromatic dispersion estimation methods discussed above fail to discriminate between actual chromatic dispersion effects and the effects of the second and higher order components of PMD present in the optical communication system. Second order PMD is characterized as the derivative of the first order PMD with respect to frequency. Because second order PMD is a function of frequency, it mimics chromatic dispersion. If the estimated chromatic dispersion in these known methods includes the effects of second order PMD, the receiver sensitivity can be seriously corrupted.

Another disadvantage of such scanning methods is that the chromatic dispersion cannot be accurately estimated until the clock recovery loop is locked. The above scanning methods typically only partially compensate for the chromatic dispersion in order to recover the timing signal. Any residual chromatic dispersion is then compensated for once the receiver clock is synchronized. These methods, however, are inefficient and unreliable since the clock recovery loop cannot lock with a satisfactory sensitivity until the signal impairments are fully compensated. This requires a high degree of complexity in the receiver and results in considerable increase in processing time and unsatisfactory delay in initializing the receiver.

Furthermore, for optical communication systems with large PMD resulting in a high DGD such as one half symbol period (i.e., T/2, where T is the symbol period), the above receiver techniques do not enable satisfactory sensitivity of clock timing recovery functionality with respect to the PMD effects of the received signal, thus resulting in poor system performance. Reliable clock timing recovery enables a receiver clock to "synchronize" with a clock phase of the received signal in order to properly demodulate the received signal. For certain polarization conditions or states of the received signal, a clock phase cannot be detected on either of the received X-polarization signal, the Y-polarization signal, or a combination of both. For example, FIG. 6 illustrates a simplified first order PMD model of fiber channel 12 in an illustrative embodiment. Block 10 represents a transmitted optical signal of X-polarization (xpol) and Y-polarization (ypol). The PMD model comprises a first order PMD block 20 which rotates the transmitted signals by a value $J1=\theta_1$, a DGD block 30, representing a delay of T/2, and PMD block 22 which rotates the signals by a value $J2=\theta_2$. In the fiber channel 12, with $\theta_2=45°$ in the PMD model, the clock phase detector 40 will detect two random (Xpol and Ypol), uncorrelated signals at T/2 delay with respect to each other. Accordingly, the clock phase detection on either of the X-polarization signal or the Y-polarization signal of the two uncorrelated signals will cancel each other out and result in a modem failure in the receiver.

Some known systems have addressed the PMD problem. The known techniques, however, lead to clock recovery loop lock points of the signal that are a function of the detected PMD conditions in the fiber channel. The lock points indicate a clock phase used in the sampling of the received signal, as discussed further below. Therefore, the receiver clock phase varies widely in response to changes in the PMD conditions of the fiber channel, which are not static and can vary significantly over time and with changes in temperature of the channel. Further, the time-varying nature of the PMD conditions result in clock jitter that can accumulate over multiple regeneration nodes in known systems and cause adverse affects in the clock phase detection circuitry.

There is a need, therefore, for an efficient, yet robust method of detecting a clock phase of the received signal for synchronizing the receiver clock with a transmit clock that is not affected by the PMD effects in a fiber channel. Thus, it is desirable to implement a method of detecting a clock phase that is tolerant to the PMD effects on the received signal even when a DGD is determined to be up to or in excess of one-half the symbol rate, or baud rate. Particularly, it is desirable to efficiently and reliably detect the clock phase of a received signal prior to and/or independent from any compensation of the effects of chromatic dispersion and PMD on the received signal.

SUMMARY OF THE DISCLOSURE

Consistent with an aspect of the present disclosure, a method for detecting a clock phase in a received optical signal is provided in which a plurality of outputs of a Fourier transform circuit generate frequency domain data in response to time domain data associated with the optical signal. A first parameter is determined based on components of the frequency data supplied from selected ones of the plurality of outputs of the Fourier transform circuit, the first parameter being indicative of a phase difference between selected ones of the plurality of components. Any effects of chromatic dispersion are then filtered from the first parameter. A second parameter indicative of the clock phase of the optical signal is then determined based on the filtered first parameter. The determined clock phase is used to synchronize a receiver clock with the clock phase of the optical signal.

Consistent with another aspect of the present disclosure, a receiver is provided comprising an analog-to-digital converter circuit configured to up-sample a received optical signal. Also provided is a Fourier transform circuit configured to generate a plurality of outputs of frequency domain data in response to time domain data associated with a received optical signal. A first module of the receiver is configured to determine a first parameter based on components of the frequency data supplied from selected ones of the plurality of outputs of the Fourier transform circuit, said first parameter being indicative of a phase difference between selected ones of the plurality of components. A second module is also provided that is configured to determine a second parameter indicative of a clock phase of the received optical signal based on said first parameter, wherein the second parameter is independent from a polarization mode dispersion effect on the received optical signal. The receiver further comprises a circuit configured to adjust an oscillator according to the second parameter, wherein the oscillator controls the sampling of the analog-to-digital converter circuit.

Consistent with another aspect of the present disclosure, a system is provided comprising a receiver configured to receive an optical signal and supply an analog signal in response to the optical signal. The receiver includes a first component configured to sample the analog signal to provide time domain data with an associated baud frequency and supply the time domain data to a Fourier transform circuit, and a second component configured to calculate a number of first parameters from a plurality of respective subsets of frequency domain data output from the Fourier transform circuit, each of said subsets including a first and second sample of the frequency domain data offset from each other by a value indicative of the baud frequency. A third component is also provided in the receiver to determine a phase of a time averaged value of each of said respective first parameters over a predetermined time period, and to calculate a second parameter indicative of a clock phase of the optical signal based on the phase of each of the plurality of said time averaged values, wherein the second parameter is not a function of polarization mode dispersion effects in the optical communication system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiment(s) and together with the description, serve to explain the principles of the invention.

DETAILED DESCRIPTION OF THE EMBODIMENTS

Figure 1A:
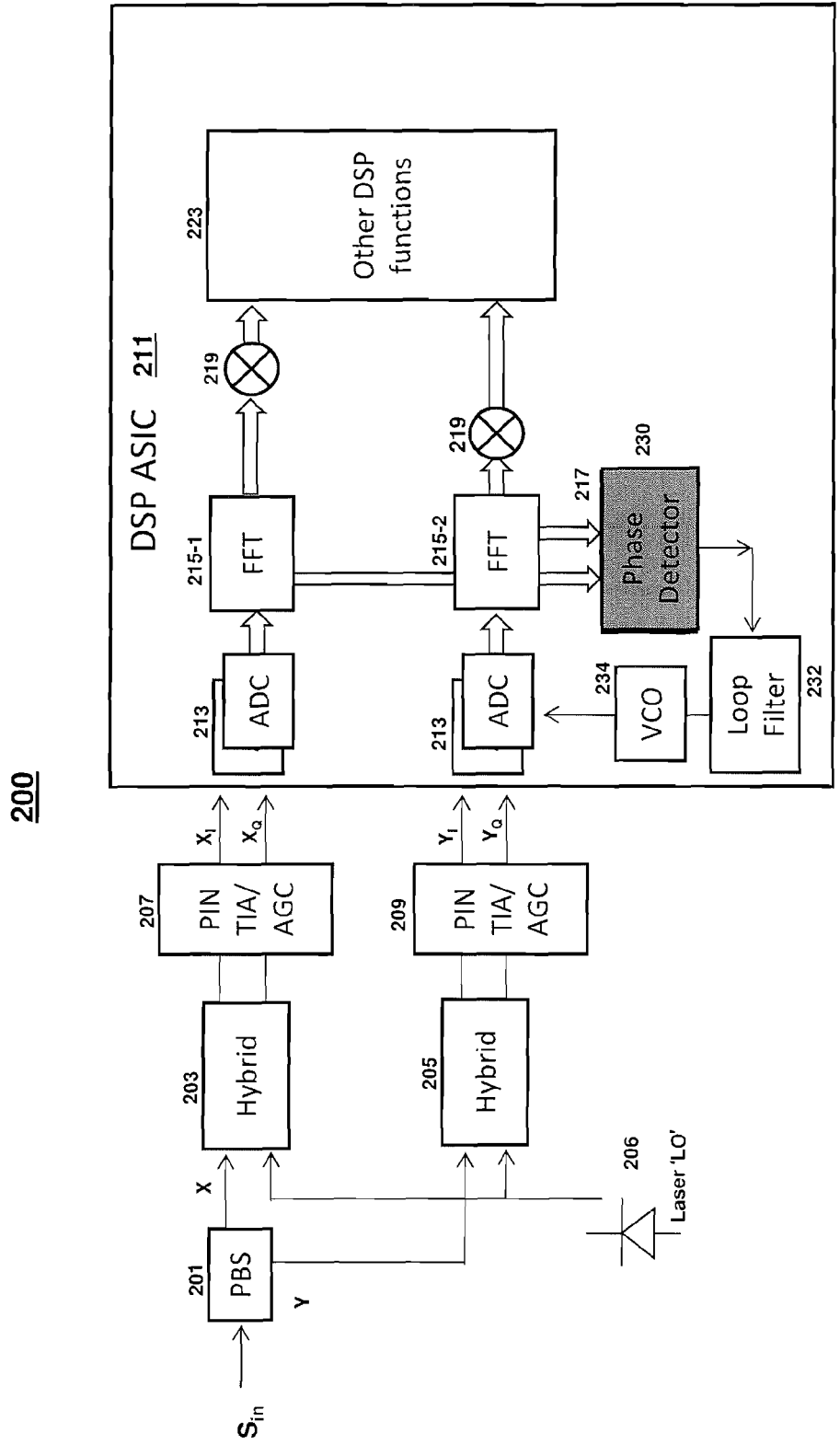
FIGS. 1a and 1b are block diagrams illustrating a coherent receiver consistent with an aspect of the present disclosure.

Consistent with the present disclosure, a method for detecting a clock phase of a received signal in a coherent receiver, and an optical communication system using the method, is provided that is insensitive to PMD effects that would otherwise cause DGD in the optical channel. A Fourier transform circuit provides, from a plurality of outputs, frequency domain data based on time domain data associated with a received optical signal. A phase difference between each of a number of pairs of related outputs of the frequency domain data is determined by computing the dot product of the related outputs. Each of the related outputs are offset from each other in the frequency domain by a value proportional to a sampling frequency, the outputs being related in that they comprise the same data spectrum. The dot product for each pair of related outputs yields a component of the data spectrum of the related outputs, a linear component of the phase difference between the related outputs, and a DC component of the phase difference. By time-averaging the dot product for each of the number of pairs over a predetermined amount of time, the data spectrum component is reduced to a constant value. A determinant of the time averaged dot products is then calculated for each frequency pair. The resultant value includes a phase error that is extracted by calculating the imaginary part of the resultant value. The imaginary part yields a value that is linearly proportional to the sine of the clock phase error. The clock phase error is then used in a phase locked loop to control an oscillator in the receiver to synchronize a sampling phase with the received signal.

When applying this method to a dual polarization multiplexed signal, the determinant of the time averaged dot products normalizes the effects of PMD and other polarization effects in the optical communication systems with respect to both polarizations of the multiplexed signal. Accordingly, the detected clock phase of the received signal is insensitive to the PMD effects in the system, even if the PMD and other polarization effects are large. Additionally, the clock phase is detected in the same calculation as a value that can be used to estimate chromatic dispersion in the system. Therefore, the clock phase can be detected without first compensating for the chromatic dispersion on the received signal, even for very large values of chromatic dispersion. Methods and systems consistent with exemplary embodiments enable a coherent receiver to efficiently detect a clock phase of the received signal together with a value for the chromatic dispersion, both insensitive to any PMD effects, thus, increasing the receiver sensitivity and boosting performance of the overall optical communication system.

Reference will now be made in detail to the present exemplary embodiments, which are illustrated in the accompanying drawings. Wherever possible, the same reference numbers will be used throughout the drawings to refer to the same or like parts.

FIG. 1a illustrates an embodiment of a coherent receiver 200 consistent with an aspect of the present disclosure. As shown, an incident optical signal $S_{in}$ is separated by a polarization beam splitter (PBS) 201 into first and second polarized signals of X and Y polarity, respectively. The polarized signals may be orthogonally polarized. The X polarity signal and the Y polarity signal are then respectively fed into two optical hybrid circuits 203 and 205 together with a reference signal for a local oscillator optical signal output from a local oscillator 10' laser 206. Each optical hybrid circuit (203, 205) supplies optical signals to detector circuits 207 and 209, each of which include known transimpedance amplifier (TIA) and automatic gain control (AGC) circuitry. Each of detector circuits 207, 209 produces two base-band electrical signals linearly proportional to the in-phase (I) and quadrature (Q) components of the optical E-field on the X and Y polarity signals, respectively (i.e. XI, XQ and YI, YQ). XI, XQ and YI, YQ are analog signals which are next fed to analog-to-digital converters (ADC) circuits 213, which may be within a digital signal processor (DSP) ASIC 211, as shown in the exemplary embodiment of FIG. 1a, or implemented using discrete digital components and/or a processor. ADC circuits 213, in turn, output digital or digitized signals, as further shown in FIG. 1a.

In order to reliably demodulate and process the received signals in the DSP ASIC 211, the analog-to-digital converter (ADC) circuits 213 must generate synchronous data to be passed to the DSP function block 223. That is, the receiver 200 must reliably recover a clock phase from the received signal, which is then used to tune a clock or voltage controlled oscillator 234 in the receiver to synchronize the receiver clock 234 with a transmitter clock (not shown). The sensitivity of the ADC circuits 213 depends on the reliable synchronization of the transmitter and receiver clock 234. Poor synchronization of the receiver clock 234 results in so-called aperture error which prevents the receiver 200 from sampling the received signal at or near its maximum and minimum points where the signal is not in transition, which is also commonly referred to as an "open-eye" due to the resemblance of an eye when the signal is detected via an oscilloscope. In other words, if the receiver clock 234 is not synchronized with a transmitter clock of the received signal, the received signal is sampled at a point in time when the signal is rapidly transitioning and the desired modulated phase and amplitude of the signal is undetectable.

Transmitter clocks are typically implemented using a crystal oscillator or crystal clock in which each oscillation represents a clock cycle designating the rate at which the transmit signals are sent. Such known transmitter clocks are relatively stable, but they are not perfect. For example, it is relatively common for the clock phase in such transmitter clocks to slowly wander over time, which affects the sensitivity of the receiver clock recovery circuit. This wandering phase is typically referred to as a clock jitter which can result in significant error in the receiver. Thus, such clock jitter is preferably detected and compensated for in a clock recovery circuit, such as loop filter 232 shown in FIG. 1a. Preferably, in high bit-rate systems, transmitting multiple bits per symbol, such clock jitter is reliably compensated for in the receiver, since high sensitivity or accuracy of the clock recovery circuit is required to reliably detect the symbol information.

As noted above, a functionality of the signal processing performed at the receiver according to the present disclosure is to digitally compensate for the chromatic dispersion. Because chromatic dispersion in optical communication systems can be represented by a linear function with respect to frequency, compensating for chromatic dispersion in a receiver can be readily implemented using a finite impulse response filter (FIR) in the frequency domain, by determining an inverse frequency response of the chromatic dispersion. One technique for estimating chromatic dispersion in the frequency domain according to this embodiment is disclosed in co-pending and commonly assigned U.S. patent application Ser. No. 12/926,533 titled PMD-Insensitive Method of Chromatic Dispersion Estimate For A Coherent Receiver (hereinafter CD estimate application), filed on Nov. 23, 2010, the entirety of which is incorporated herein by reference. The methods and systems implemented in the CD estimate application are insensitive to PMD effects of the received signal. As disclosed in the CD estimate application and further discussed below, the method for estimating chromatic dispersion directly from the received signal in the frequency domain may also yield information or an expression for the clock phase. A method according to the present application utilizes the clock phase information or expression to reliably recover a clock timing signal in order to synchronize the receiver clock 234 (FIG. 1a) with the transmit clock.

Figure 1B:
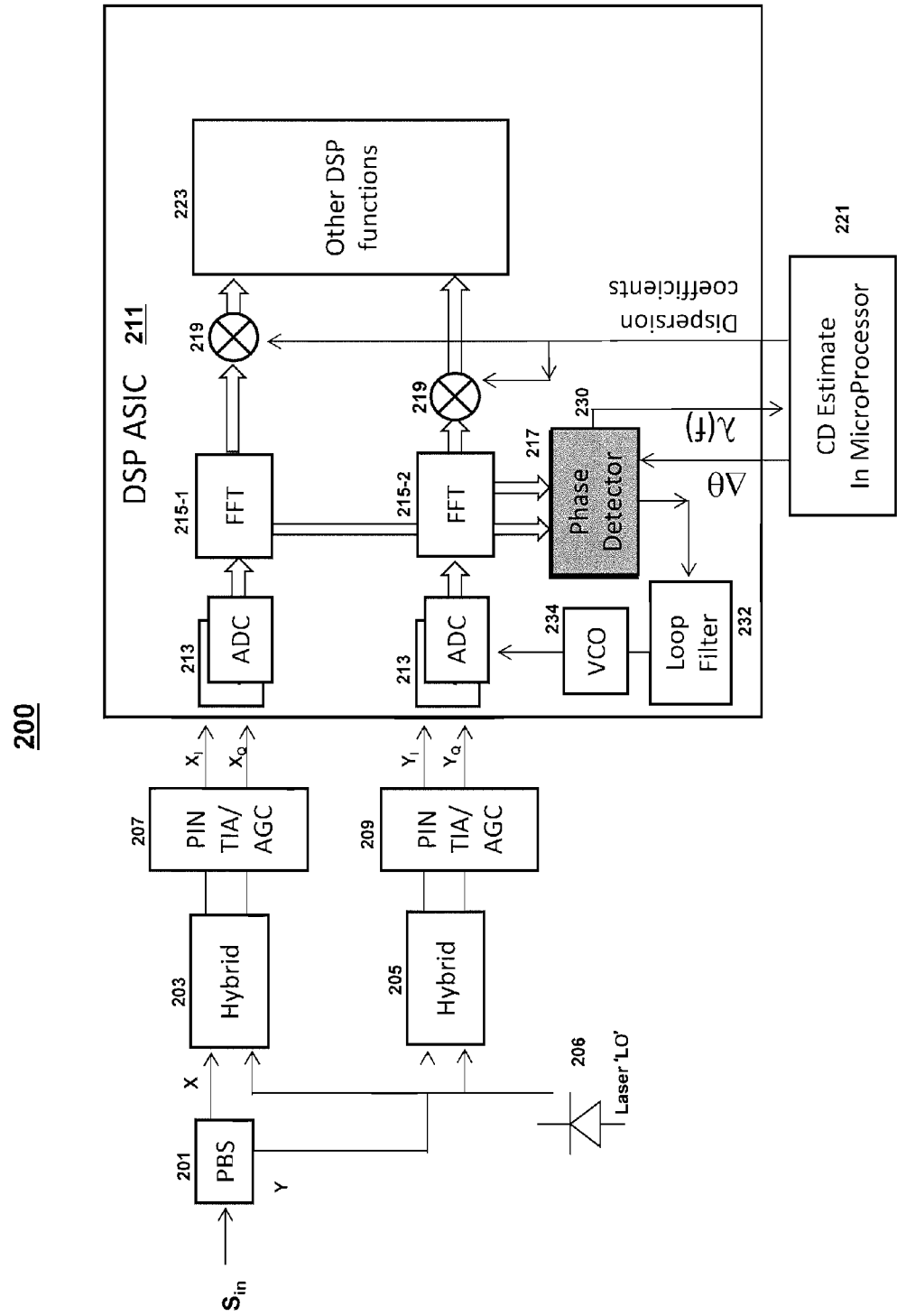

FIG. 1b illustrates an exemplary receiver 200 including a CD estimate microprocessor 221 for executing the chromatic dispersion estimation functionality discussed in the above identified CD estimate application. As discussed above, since an expression for the clock phase is derived in the frequency domain, the present phase detector circuitry block 230 shown in FIGS. 1a and 1b advantageously operates in the frequency domain. Frequency domain clock phase detectors have been described in known systems and are proven to be functionally equivalent to more conventional squaring phase detectors, as would be apparent to one of ordinary skill in the art. Thus, according to the disclosed embodiments, a plurality of Fast Fourier Transform (FFT) blocks or circuits 215-1 and 215-2 receive the digitized signals, supplied by ADC circuits 213, which are all in the time domain, and output signals which are in the frequency domain.

As shown in FIGS. 1a and 1b, a first FFT block 215-1 is used to transform digitized outputs associated with X polarity signals (XI and XQ) and a second FFT block 215-2 is used to transform digitized outputs associated with Y polarity signals (YI and YQ). For example, as depicted in FIGS. 1a and 1b, FFT blocks 215-1 and 215-2 have 256 outputs each, and thus may perform a 256 "point" transformation of the received signals, however, the present disclosure is not limited to this specific design and other methods of transforming the digital signals to the frequency domain could be used consistent with the present disclosure.

Figure 2:
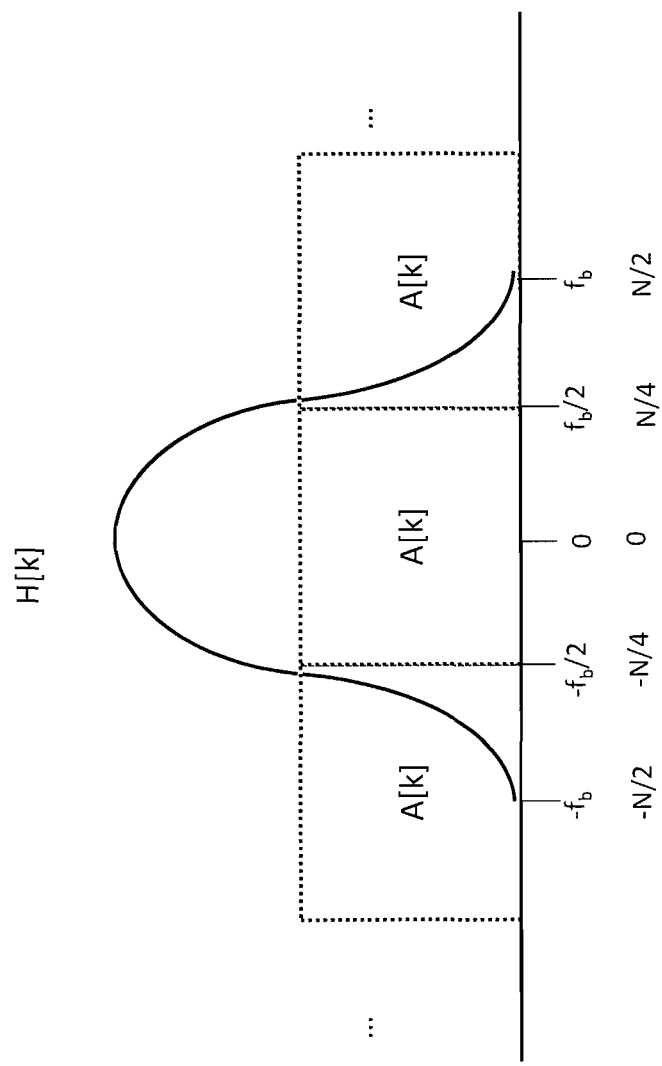
FIG. 2 is a diagram of a sample signal spectrum used to demonstrate the concept of detecting a clock phase with an aspect of the present disclosure.

To help understand the exemplary embodiments, a simplified explanation of the frequency domain representation of the received signal is provided here with respect to FIG. 2. A transmitted signal with continuous data symbols is designated as a[n]. In the exemplary embodiments, the transmitted data symbols are considered to be random, complex symbols with zero mean. At the receiver, the received signal is up-sampled by ADC converters 213 that sample at a rate of two samples per symbol, for example. In practice, the exemplary embodiments may be realized using any sampling rate at least equal to or greater than the transmit baud rate, i.e. greater than or equal to 1 sample per symbol. In this example, the sampled data is designated as x[n] and has a length N which represents a value twice the system baud rate $f_b$. After processing by the FFT blocks 215-1 and 215-2, the frequency domain representation of the received signal can be written as X[k] using Eqn. 1 below where A[k] represents the frequency domain data spectrum and H[k] represents a channel response as shown in FIG. 2. The channel response H[k] of Eqn. 2 can be represented using a simple amplitude weighting function H'[k] with clock phase error τ (normalized to symbol period $1/f_b$). As shown in FIG. 2, due to aliasing, H'[k] is highly attenuated beyond $\pm f_b$ (or $\pm N/2$).

$$X[k] = A[k] \cdot H[k]$$ (Eqn. 1)

$$H[k] = H'[k] \cdot e^{-j \cdot 4 \cdot \pi \cdot k \cdot \tau / N}$$ (Eqn. 2)

In this explanation, it is assumed that the received signal a[n] is a periodic signal. Since the signal a[n] is sampled at a rate of two samples per symbol, the length of a[n] is N/2. A[k] represents the N-point FFT of a time domain signal a'[m], where a'[m] is the two times (2×) up-sampled signal a[n]. In this example, the up-sampling is performed by zero insertion, such that a'[0, 2, 4 . . . ]=a[n], and a'[1, 3, 5 . . . ]=0. As understood, e.g., in view of the sampling theorem, the data spectrum of A[k] repeats as shown in FIG. 2. In other words, the frequency components of A[k] between $f_b/2$ to $f_b$ (N/4 to N/2) are the same as those components between $-f_b/2$ to 0 (−N/4 to 0), that is, the data spectrum of A[k] is periodic with period $f_b$ (or N/2).

Using the above property of the up-sampled signal, the frequency components of the sampled data A[k] are said to be correlated across $f_b$. This is advantageous because there is an opportunity to estimate a phase difference between the correlated components in the received signal X[k] across $f_b$ (or across N/2 samples in frequency). Since the received signals are complex signals, an imaginary value of the phase differences between each of the correlated components are then summed to determine a value for the clock phase error τ as further discussed below, which is then used to synchronize the receiver clock 234.

Since the coherent receiver 200 in the exemplary embodiments advantageously detects and demodulates dual polarized multiplexed signals as discussed above with respect to FIG. 1a, the above explanation can be expanded to represent both the X-polarization signal data spectrum and the Y-polarization signal data spectrum, as shown in FIGS. 3a-3d. Methods according to the exemplary embodiments advantageously estimate a clock phase error using both the X-polarization signal and the Y-polarization signal such that the estimated clock phase error may be insensitive to the PMD effects and DGD in the received signal. More particularly, the exemplary embodiments determine a clock phase error based on an average value of delay common to both the X-polarization signal and the Y-polarization signal, as opposed to a relative delay between the respective signals, which is indicative of the PMD. It is shown below that determining the common average value of delay enables recovery of the clock phase error of a transmit clock of the received signal, which is then used to synchronize the receiver clock 234 for reliable sampling and demodulation of the received signal. The individual steps of the following exemplary method are illustrated in the flow diagram of FIG. 5 (discussed below), and are referred to throughout.

Figure 3:
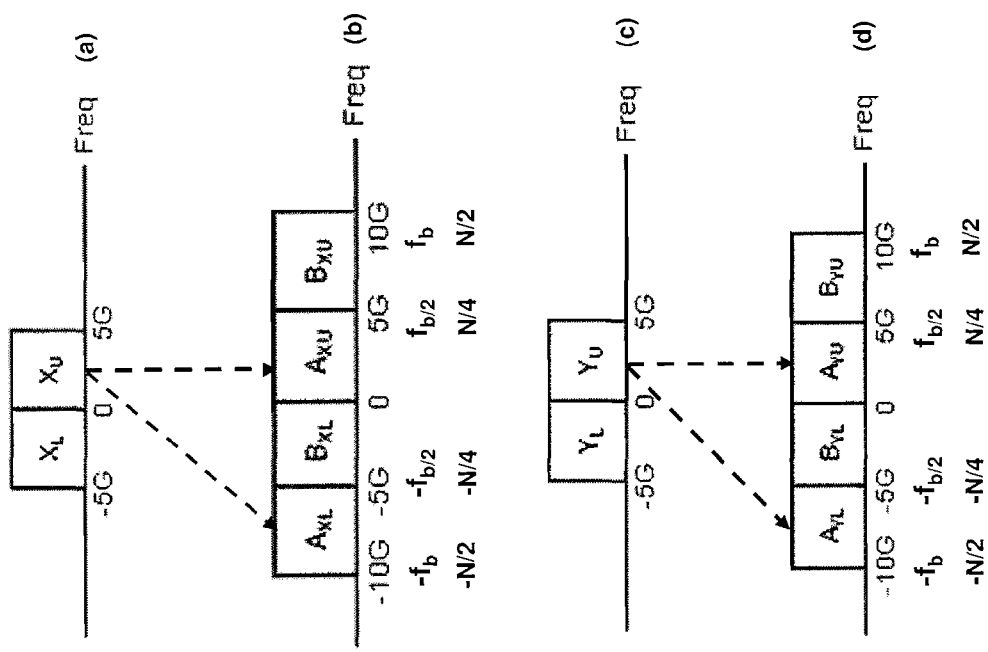
FIG. 3 is a diagram of a sample signal spectrum of a polarization multiplexed signal used to expand on the concept in FIG. 2 with an aspect of the present disclosure.

FIG. 3 illustrates the data spectra for a two polarization (X and Y) multiplexed signal received in receiver 200. The received data spectrum includes both X and Y polarization components, which "overlap" as shown in FIGS. 3(a) and 3(c); that is $X_L$ and $Y_L$ temporally align with each other and $X_U$ and $Y_U$ align. The representative up-sampled signals output from the ADC circuits 213 and converted to the frequency domain using FFT circuits 215-1 and 215-2 are illustrated in FIGS. 3(b) and 3(d) (steps 501 and 503 in FIG. 5). As in FIG. 2, the received signal spectrum may be 2 times up-sampled by twice the baud rate or baud frequency. For example, the received signal has a baud rate of 10 Gbaud ($f_b$ or N/2), whereas the up-sampled signal now spans 20 Gbaud (N). In FIG. 3, the received data spectrum (A[k] in FIG. 2) is designated using an upper side-band ($X_U$ and $Y_U$) and a lower side-band ($X_L$ and $Y_L$) representation. As a result of the up-sampling of the received signal shown in FIGS. 3(a) and 3(c), the data from $X_U$ and $Y_U$ is effectively copied or repeated as indicated by the dashed arrows, the repeated data being spectrally spaced from one another by a value indicative of the baud frequency $f_b$ (or across N/2 samples in frequency). More particularly, in FIG. 3(b), $A_{XU}$ and $A_{XL}$ include the repeated data spectrum from $X_U$, and $A_{YU}$ and $A_{YL}$ include the repeated data spectrum from $Y_U$, the copied data spectrum being offset by a value indicative of the baud frequency. The values of $B_{XU}$, $B_{XL}$, $B_{YU}$ and $B_{YL}$ similarly represent the repeated data spectrum of $X_L$ and $Y_L$, respectively. As discussed with respect to FIG. 2, the repeated X-polarization data spectrum components are correlated to each other and the repeated Y-polarization data spectrum components are also correlated to each other. However, since the data spectrum is assumed to be random, there is no correlation between the X-polarization data and the Y-polarization data for any of the frequency components, the significance of which is discussed further below.

To demonstrate that the exemplary embodiment is insensitive to PMD effects of the optical fiber and therefore DGD in the received signal, the received up-sampled signals can be represented mathematically to include the effects of PMD and any other polarization rotation effects. Due to the PMD effects in the optical fiber, the received X-polarization signal is a combination of the transmitted X-polarization data and the Y-polarization data. Thus, as shown in FIGS. 3a-3d, the received signal is represented using the 'A' and 'B' representations of the data spectrum which include both X and Y polarization data.

As would be understood by one of ordinary skill in the art, the polarization rotations of the transmitted signal can be represented using a Jones matrix, as shown in Eqn. 3. Accordingly, using the matrix representation of Eqn. 3 below, for the dual polarized signal, $A_{XU}$ can be represented as a function of $X_U$ and $Y_U$ times the corresponding elements in the Jones matrix, which is used to model the PMD effects in the optical communication system. In Eqn. 3 below, $\phi$ represents the phase of the received signal and $\theta$ represents the polarization rotations of the received signal.

$$\begin{bmatrix} x' \\ y' \end{bmatrix} = \begin{bmatrix} \cos\theta \cdot e^{-j\phi} & -\sin\theta \\ \sin\theta & \cos\theta \cdot e^{j\phi} \end{bmatrix} \begin{bmatrix} x \\ y \end{bmatrix} \quad \text{(Eqn. 3)}$$

The data spectrum blocks $A_{XU}$, $A_{YU}$, and $A_{XL}$, $A_{YL}$ shown in FIGS. 3b and 3d comprise frequency components k in the frequency domain. The exemplary embodiment is explained using an analysis at one frequency component, k=1 for example. $A_{XU}[1]$ can be represented as a linear combination of $X_U[1]$ and $Y_U[1]$, and the polarization rotation matrix of Eqn. 3. The phase and polarization rotations in the upper side band representations ($A_{XU}$ and $A_{YU}$) are designated as $\phi_1$ and $\theta_1$ for frequency bin at k=1. Using this representation, the expressions for $A_{XU}[1]$ and $A_{YU}[1]$ are as shown in Eqn. 4 and Eqn. 6, respectively. A phase $\phi_U$ of the upper side band representations ($A_{XU}$ and $A_{YU}$) common to both X-polarization and Y-polarization signals is also added to the expressions. The phase and polarization rotations in the lower side band representations ($A_{XL}$ and $A_{YL}$) are designated as $\phi_2$ and $\theta_2$ for frequency bin at k=1. Using this representation, the expressions for $A_{XL}[1]$ and $A_{YL}[1]$ are as shown in Eqn. 5 and Eqn. 7, respectively. As above, a phase $\phi_L$ of the lower side band representations ($A_{XL}$ and $A_{YL}$) common to both X-polarization and Y-polarization signals is added to the expressions. It is from these common phase values ($\phi_U$ and $\phi_L$) that an expression for the transmit clock phase can be derived.

$$A_{XU}[1] = (X_U[1]\cos\theta_1 e^{-j\phi_1} - Y_U[1]\sin\theta_1) \cdot e^{j\phi_U} \quad \text{(Eqn. 4)}$$

$$A_{XL}[1] = (X_U[1]\cos\theta_2 e^{-j\phi_2} - Y_U[1]\sin\theta_2) \cdot e^{j\phi_L} \quad \text{(Eqn. 5)}$$

$$A_{YU}[1] = (X_U[1]\sin\theta_1 + Y_U[1]\cos\theta_1 e^{+j\phi_1}) \cdot e^{j\phi_U} \quad \text{(Eqn. 6)}$$

$$A_{YL}[1] = (X_U[1]\sin\theta_2 + Y_U[1]\cos\theta_2 e^{+j\phi_2}) \cdot e^{j\phi_L} \quad \text{(Eqn. 7)}$$

As shown, the equations for $A_{XU}[1]$ and $A_{XL}[1]$ both use data $X_U[1]$ and $Y_U[1]$. This is due to the property of an up-sampled signal discussed above where $A_{XL}$ contains the same data spectrum as $A_{XU}$, except that they are shifted by a frequency proportional to the up-sampling rate as shown in FIGS. 3b and 3d. In the exemplary embodiment, $A_{XU}[1]$ and $A_{XL}[1]$ are separated in frequency by the baud rate. PMD can be generally defined as a frequency dependent rotation causing a different amount of polarization rotation induced on the signal at different frequencies. Thus, the expressions for $A_{XU}$ and $A_{YL}$ differ from $A_{XU}$ and $A_{YU}$ only in the subscripts for $\theta$ and $\phi$, where the frequency component in the upper side band representations ($A_{XU}$ and $A_{YU}$) is rotated by $\phi_1$ and $\theta_1$ and the frequency component in the lower side band representations ($A_{XL}$ and $A_{YL}$) is rotated by $\phi_2$ and $\theta_2$. The above expressions (Eqn. 4-Eqn. 7) therefore include the effects of all orders of PMD. The expressions for $B_{XU}$, $B_{XL}$, $B_{YU}$ and $B_{YL}$, which are copies of the lower side band data spectrum of X and Y, respectively, can be written using the expressions shown in Eqns. 4-7, respectively, by substituting $X_L$ for $X_U$ and $Y_L$ for $Y_U$.

As discussed above, the frequency difference between correlated components $A_{XU}[1]$ and $A_{XL}[1]$ in the exemplary embodiment differs by the baud rate (10 GHz), and similarly for $A_{YU}[1]$ and $A_{YL}[1]$. Therefore, the common phases introduced ($\phi_U$ and $\phi_L$) span 10 GHz. In the proper definition of an N-point FFT in the exemplary twice up-sampled embodiment, the correlated components are represented as [k] and [k±N/2]. Any clock phase error, which may be considered a delay, will induce a large difference between $\phi_U$ and $\phi_L$. It is this clock phase error that the exemplary embodiment effectively determines and does so independent of the polarization rotation $\theta$'s and $\phi$'s.

Figure 5:
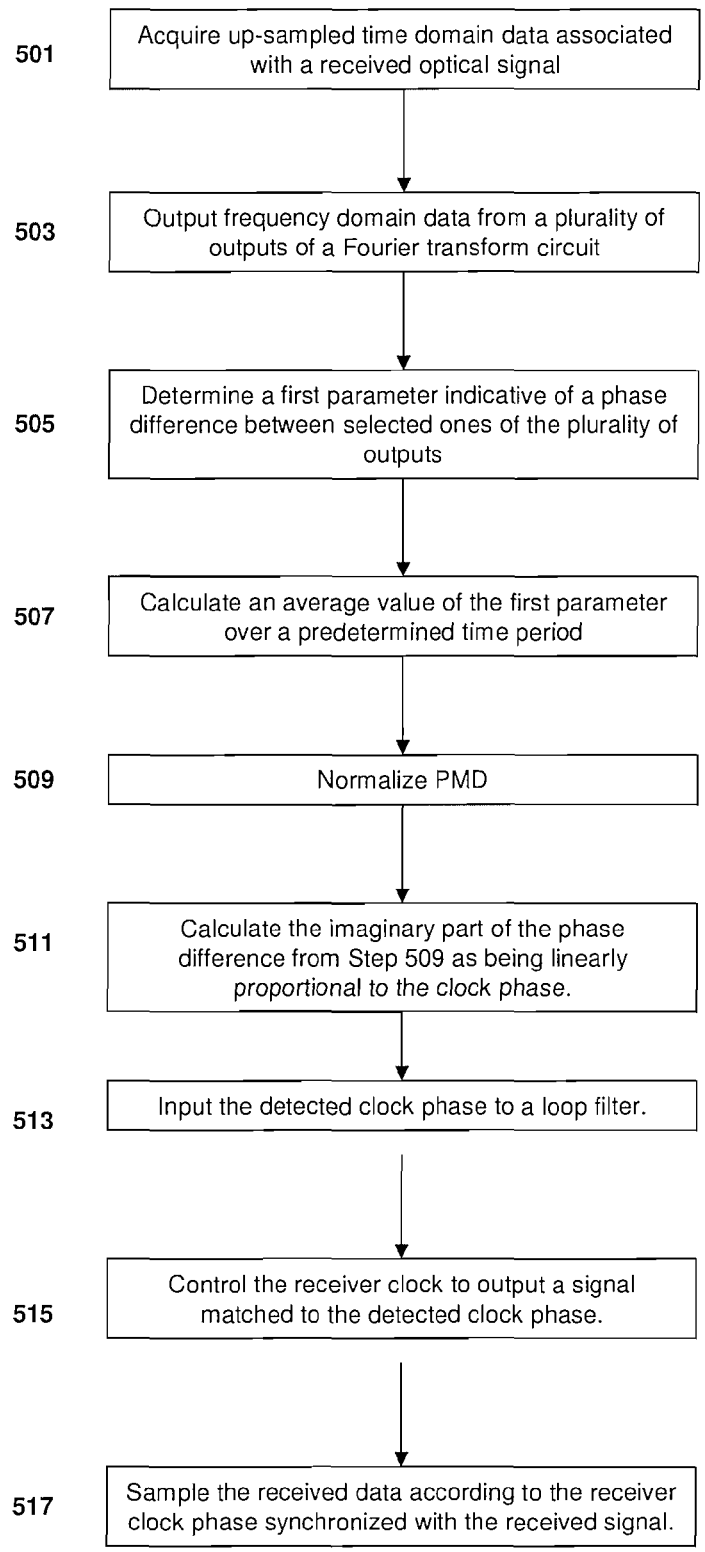
FIG. 5 is a flow diagram illustrating the steps performed in detecting the clock phase consistent with an aspect of the present disclosure.
Figure 6:
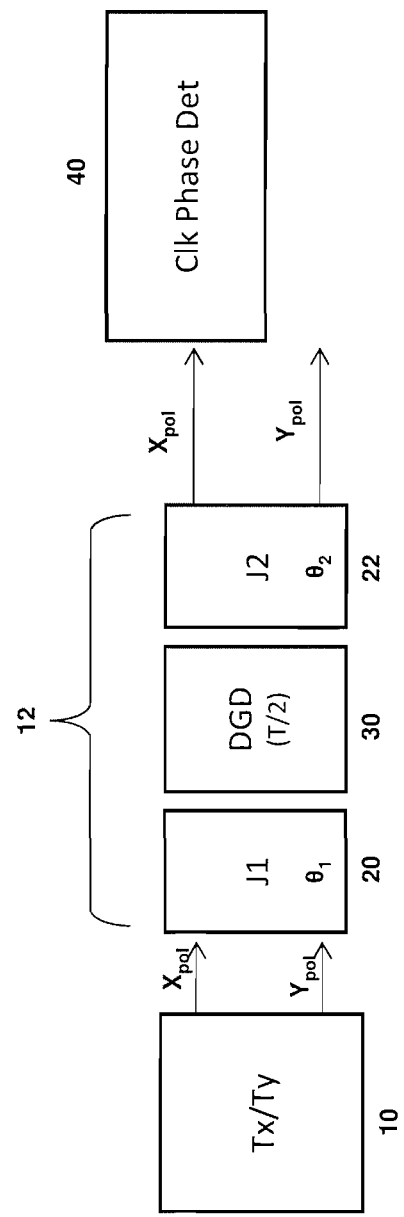
FIG. 6. is a sample channel diagram used to demonstrate the PMD effects in a channel with an aspect of the present disclosure.

FIG. 5 depicts a flow diagram illustrating the exemplary steps for estimating a clock phase error value according to the exemplary embodiments. As discussed above, the desired value for estimating the clock phase error in the exemplary embodiments is '$\phi_U - \phi_L$'. Specifically, as shown in step 505 of FIG. 5, the common phase difference represented by '$\phi_U - \phi_L$' is preferably detected for each of the desired frequency bins k. The DC value of '$\phi_U - \phi_L$' is proportional to a clock phase z, which represents the clock phase error in the received signal. To solve for the desired value '$\phi_U - \phi_L$', the above Eqns. 4-7 are selectively multiplied together using a dot product between an upper side band representation and a complex conjugate of the lower side band representation of correlated components. From Eqns. 4-7, there are four (4) dot product calculations that are performed that result in the desired term, '$\phi_U - \phi_L$'. For example, the dot product of $A_{XU}$ and the complex conjugate of $A_{XL}$ results in the desired term '$\phi_U - \phi_L$', as shown in the simplified expression in Eqn. 8 below.

$$\langle A_{XU}[1] \cdot A_{XL}^*[1] \rangle = \langle (X_U[1]\cos\theta_1 e^{-j\phi_1} - Y_U[1]\sin\theta_1) \cdot (X_U[1]\cos\theta_2 e^{-j\phi_2} - Y_U[1]\sin\theta_2)^* \rangle \cdot e^{j\phi_U - \phi_L}$$

$$\langle A_{XU}[1] \cdot A_{XL}^*[1] \rangle = \langle (X_U[1] \cdot X_U^*[1])\cos\theta_1\cos\theta_2 e^{-j\phi_2 - \phi_1} + Y_U[1]Y_U^*[1]\rangle \sin\theta_1\sin\theta_2) \cdot e^{j\phi_U - \phi_L}$$

$$\langle A_{XU}[1] \cdot A_{XL}^*[1] \rangle = (\cos\theta_1\cos\theta_2 e^{-j\phi_2 - \phi_1} + \sin\theta_1\sin\theta_2) \cdot e^{j\phi_U - \phi_L} \quad \text{(Eqn. 8)}$$

As shown above, the resultant vector of the dot product between $A_{XU}$ and the complex conjugate of $A_{XL}$ contains a component of $|X_U[1]|^2$, $|Y_U[1]|^2$, and $X_U[1] \cdot Y_U^*[1]$, each of which may appear noisy. The values $|X_U[1]|^2$ and $|Y_U[1]|^2$ are squared because the data at these components are correlated in that they may have the same data spectrum. As represented in step 507 of FIG. 5, an average value of these components is calculated over a predetermined time period. By time averaging the resultant vectors of Eqn. 8 (represented by <>) over a desired number of clock cycles in the receiver, the above components of the data spectra are normalized out of the system, as is shown in the simplified expression of Eqn. 8. For instance, by utilizing a sufficient number of clock cycles, the components for $|X_U[1]|^2$ and $|Y_U[1]|^2$ approach a value of 1. This is evident since the data spectrum of $X_U[1]$ and $Y_U[1]$ may be random signals that when averaged over a period of time resemble the signal power of the original data. Further, the value $X_U[1] \cdot Y_U^*[1]$ estimates to zero (0) over time, since these signals are orthogonal to each other and do not correlate. Accordingly, no phase information is preserved for these components and the polarization representations of these components can be disregarded. In the exemplary embodiment, 64 clock cycles are used in the averaging step. The number of clock cycles implemented in practice, however, may be any number of clock cycles, such as 4, 8, 16, 32 and may selectively be chosen based on the optical channel conditions discussed further below.

Similar steps to those described above are performed to calculate the time averaged dot product between $A_{YU}$ and the complex conjugate of $A_{YL}$, which results in the simplified expression of Eqn. 9. The other two dot products that provide the desired term '$\phi_U - \phi_L$' are simplified in Eqns. 10 and 11.

$$\langle A_{XU}[1] \cdot A_{XL}^*[1] \rangle = (\cos\theta_1\cos\theta_2 e^{j(\phi_2 - \phi_1)} + \sin\theta_1\sin\theta_2) \cdot e^{j(\phi_U - \phi_L)} \quad \text{(Eqn. 8)}$$

$$\langle A_{YU}[1] \cdot A_{YL}^*[1] \rangle = (\cos\theta_1\cos\theta_2 e^{j(\phi_1 - \phi_2)} + \sin\theta_1\sin\theta_2) \cdot e^{j(\phi_U - \phi_L)} \quad \text{(Eqn. 9)}$$

$$\langle A_{XU}[1] \cdot A_{YL}^*[1] \rangle = (\cos\theta_1\sin\theta_2 e^{-j\phi_1} - \sin\theta_1\cos\theta_2 e^{-j\phi_2}) \cdot e^{j(\phi_U - \phi_L)} \quad \text{(Eqn. 10)}$$

$$\langle A_{YU}[1] \cdot A_{XL}^*[1] \rangle = (\sin\theta_1\cos\theta_2 e^{j\phi_2} - \cos\theta_1\sin\theta_2 e^{j\phi_1}) \cdot e^{j(\phi_U - \phi_L)} \quad \text{(Eqn. 11)}$$

As discussed above, the data spectra for $X_U$ and $Y_U$ are averaged out over time and may be disregarded here. From Eqns. 8-11, the desired value '$\phi_U - \phi_L$' may be difficult to solve due to the presence of the PMD effects represented by the terms $\theta_1, \phi_1, \theta_2$ and $\phi_2$. The above equations, however, represent a linear system, the solution of which can be determined by calculating the determinant of a 2×2 matrix representing the polarization rotations in the linear system of Eqns. 8-11. The determinant of a 2×2 matrix is calculated by multiplying the first diagonal components and subtracting from this value the product of the second diagonal components. Eqn. 12 represents the result of multiplying the first diagonal components of a matrix representing the linear system together and Eqn. 13 represents the result of multiplying the second diagonal components together. Eqn. 14 represents the result of subtracting Eqn. 13 from Eqn. 12, and represents the determinant of the matrix representing the linear system above.

$$\langle A_{XU} \cdot A_{XL}^* \rangle \cdot \langle A_{YU} \cdot A_{YL}^* \rangle = (\cos\theta_1\cos\theta_2 e^{j(\phi_2 - \phi_1)} + \sin\theta_1\sin\theta_2) \cdot \quad \text{(Eqn. 12)}$$
$$(\cos\theta_1\cos\theta_2 e^{j(\phi_1 - \phi_2)} + \sin\theta_1\sin\theta_2) \cdot e^{j2(\phi_U - \phi_L)} =$$
$$(\cos^2\theta_1\cos^2\theta_2 + \sin^2\theta_1\sin^2\theta_2 +$$
$$\sin\theta_1\sin\theta_2\cos\theta_1\cos\theta_2(e^{j(\phi_1 - \phi_2)} + e^{j(\phi_2 - \phi_1)})) \cdot e^{j2(\phi_U - \phi_L)}$$

$$\langle A_{XU} \cdot A_{YL}^* \rangle \cdot \langle A_{YU} \cdot A_{XL}^* \rangle = (\cos\theta_1\sin\theta_2 e^{-j\phi_1} - \sin\theta_1\cos\theta_2 e^{-j\phi_2}) \cdot \quad \text{(Eqn. 13)}$$
$$(\sin\theta_1\cos\theta_2 e^{j\phi_2} - \cos\theta_1\sin\theta_2 e^{j\phi_1}) \cdot e^{j2(\phi_U - \phi_L)} =$$
$$(\sin\theta_1\sin\theta_2\cos\theta_1\cos\theta_2(e^{j(\phi_2 - \phi_1)} + e^{j(\phi_1 - \phi_2)}) -$$
$$\sin^2\theta_1\cos^2\theta_2 - \sin^2\theta_2\cos^2\theta_1) \cdot e^{j2(\phi_U - \phi_L)}$$

$$\langle A_{XU} \cdot A_{XL}^* \rangle \cdot \langle A_{YU} \cdot A_{YL}^* \rangle - \langle A_{XU} \cdot A_{YL}^* \rangle \cdot \langle A_{YU} \cdot A_{XL}^* \rangle = \quad \text{(Eqn. 14)}$$
$$(\cos^2\theta_1\cos^2\theta_2 + \sin^2\theta_1\sin^2\theta_2 + \sin^2\theta_1\cos^2\theta_2 + \sin^2\theta_2\cos^2\theta_1) \cdot$$
$$e^{2j(\phi_U - \phi_L)} =$$
$$(\cos^2\theta_1 + \sin^2\theta_1)(\cos^2\theta_2 + \sin^2\theta_2) \cdot e^{2j(\phi_U - \phi_L)} = 1 \cdot e^{2j(\phi_U - \phi_L)}$$

With respect to step 509, and as shown in the simplified expression of Eqn. 14, by calculating the determinant function of the modeled system, the PMD effects, i.e., those represented by $\theta_1, \phi_1, \theta_2$ and $\phi_2$, are normalized out of the system. The resultant value has a phase that is linearly proportional to the desired quantity '$\phi_U - \phi_L$'. Accordingly, by forming the determinant of the above correlated results, a clock phase error is reliably extracted for all orders of PMD and for arbitrarily large values of PMD. Furthermore, the extracted clock phase error is not a function of the PMD. In other words, variances in the PMD affects in the system do not affect the detected clock phase error. Additionally, an estimate of the chromatic dispersion in the optical system can also be extracted from the above result, as disclosed in the CD estimate application referenced above. Accordingly, it is also shown that the clock phase error can be extracted from the received signal prior to any compensation of the chromatic dispersion directly on the received signal, the advantages of which are discussed further below.

The above result follows from the known properties of a Jones matrix. For instance, Eqn. 15 demonstrates that the determinant of a Jones matrix is consistent with the above result. Since polarization rotations do not affect the result of Eqn. 14, the exemplary method demonstrates that the detected clock phase error in the optical communication system is insensitive to any PMD effects.

$$\det\left\{\begin{bmatrix} \cos\theta \cdot e^{-j\phi} & -\sin\theta \\ \sin\theta & \cos\theta \cdot e^{+j\phi} \end{bmatrix} e^{ja}\right\} = e^{2ja} \quad \text{(Eqn. 15)}$$

To calculate the clock phase error from the result in Eqn. 14, the time averaged value of each of the dot products in Eqns. 10-12, over a desired number of clock cycles, represented as $\langle A_{XU} \cdot A_{XL}^* \rangle$, $\langle A_{YU} \cdot A_{YL}^* \rangle$, $\langle A_{XU} \cdot A_{YL}^* \rangle$, and $\langle A_{YU} \cdot A_{XL}^* \rangle$ is collected for a selected number of frequency components of the transformed received signal. In the exemplary embodiment, the result in Eqn. 14 is determined for every frequency component. For a 256 pt FFT operation up-sampled with two samples per symbol, k=0:127 in the expression below (Eqn. 16). The same expression can be generated for $B_{XU}, B_{XL}, B_{YU}$ and $B_{YL}$ using the above steps.

$$\lambda[k] = \langle A_{XU}[k] \cdot A_{XL}^*[k] \rangle \cdot \langle A_{YU}[k] \cdot A_{YL}^*[k] \rangle - \langle A_{XU}[k] \cdot A_{YL}^*[k] \rangle \cdot \langle A_{YU}[k] \cdot A_{XL}^*[k] \rangle \quad \text{(Eqn. 16)}$$

Once the value for $\lambda[k]$ is determined for each of the frequency components, the imaginary part of $\lambda[k]$ is then used to determine a value of the clock phase delay, or error, $\tau$. Referring back to Eqn. 2 above, the phase error $\tau$ can be determined from the channel response H[k] which represents delay in the optical channel. In the exemplary embodiment, in which the sampling rate is $2f \cdot f_{baud}$, and a 256 pt FFT is used to define the frequency domain data, the channel response H[k] can be evaluated using the expression in Eqn. 17. The phase of the channel response is represented by the expression for $\phi[k]$ in Eqn. 18.

$$H[k] = e^{j\frac{2\pi \cdot 2 \cdot f_{baud}}{256} \cdot k \cdot \tau} \quad \text{(Eqn. 17)}$$

$$\phi[k] = \frac{2\pi \cdot 2 \cdot f_{baud}}{256} \cdot k \cdot \tau \quad \text{(Eqn. 18)}$$

The phase difference in the channel response $\phi_U[k]-\phi_L[k]$ is then determined across the baud rate of the received signal. For example, the phase difference evaluated below in Eqns. 19-21, is analyzed using the frequency bins represented by $\pm f_{baud}/2$, which is bin index +64 and −64. In this example, $A_{XU}[1]$ is represented by index bin 64 and $A_{XL}[1]$ is represented by index bin −64 (or 192) in the proper definition of FFT.

$$\phi_U[1] = \frac{2\pi \cdot 2 \cdot f_{baud}}{256} \cdot 64 \cdot \tau \quad \text{(Eqn. 19)}$$

$$\phi_L[1] = \frac{2\pi \cdot 2 \cdot f_{baud}}{256} \cdot -64 \cdot \tau \quad \text{(Eqn. 20)}$$

$$\phi_U[1] - \phi_L[1] = \frac{2\pi \cdot 2 \cdot f_{baud}}{256} \cdot 128 \cdot \tau = 2\pi \cdot f_{baud} \cdot \tau \quad \text{(Eqn. 21)}$$

From Eqn. 14, it is shown that $\lambda[k]=e^{j \cdot 2 \cdot (\Phi_U-\Phi_L)}$; therefore, using the expression derived in Eqn. 21, the clock phase error $\tau$ can be determined by solving for the imaginary value of $\lambda[k]$ as shown in Eqn. 22 and as described in step 511. This result produces a common phase difference estimate that is linearly proportional to the sine of the clock phase error, $\tau$. Since the clock phase error $\tau$ is based on any transience in the transmitter clock, the phase error should be small, e.g., close to zero. For this reason, the imaginary part of $\lambda[k]$ is used to calculate the clock phase error since a sine function appears relatively linear around 0 degrees. One of ordinary skill in the art would understand that the real value of $\lambda[k]$ can also be used to estimate the clock phase error $\tau$. In this case, the common phase difference estimate is linearly proportional to cosine of the clock phase error $\tau$. As understood by one of ordinary skill in the art, the cosine function is offset from the sine function by 90 degrees. Therefore, the phase error $\tau$ can be reliably determined, but it will be offset by 90 degrees. To further average the phase estimate against noise in the system, all or some number of frequency components can be summed together as shown in Eqn. 23.

$$\text{Im}\{\lambda[k]\} = \sin(2 \cdot (\phi_U - \phi_L)) = \sin(2 \cdot 2\pi \cdot f_{baud} \cdot \tau) \quad \text{(Eqn. 22)}$$

$$\sum_k \text{Im}\{\lambda[k]\} = \sin(2 \cdot 2\pi \cdot f_{baud} \cdot \tau) \quad \text{(Eqn. 23)}$$

Figure 4:
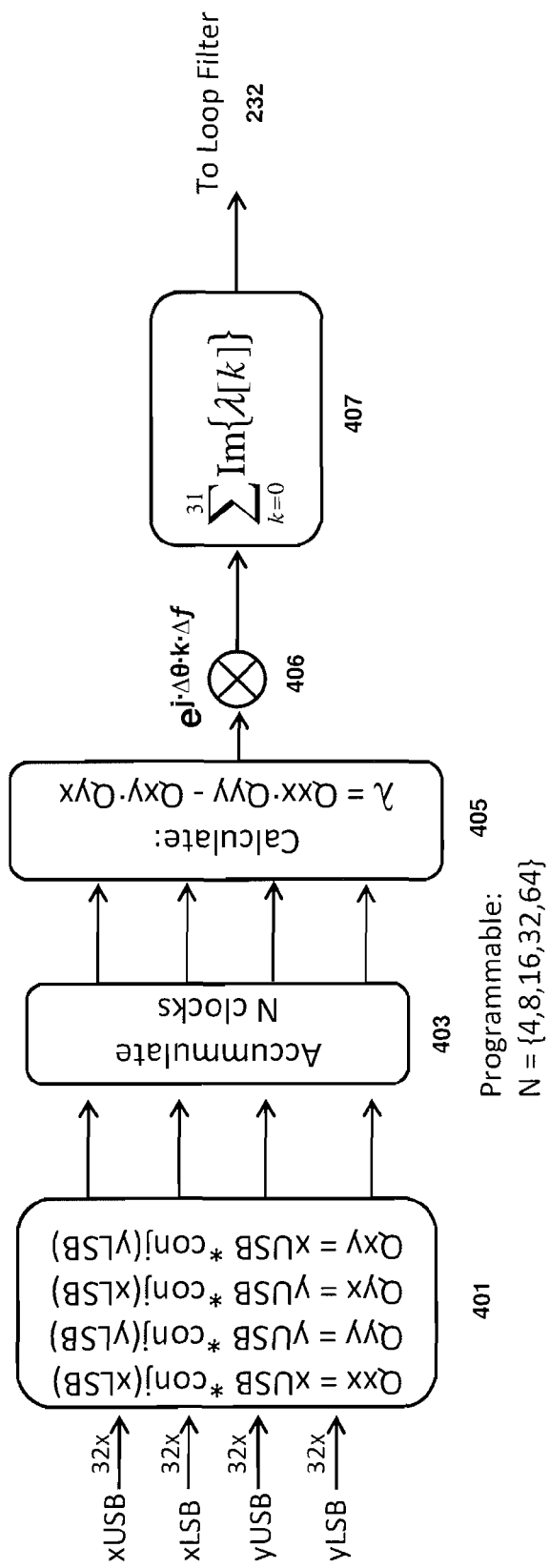
FIG. 4 is a block diagram of a clock phase detector circuit consistent with an aspect of the present disclosure.

FIG. 4 depicts a block diagram of the functionality of the phase detector block 230 shown in FIG. 1b for performing the above functionality. In this exemplary embodiment, the FFT blocks 215-1 and 215-2 output 256 frequency domain data samples of the received signal for each clock cycle in the receiver. In the exemplary embodiment, frequency domain data representations are performed on the received signal prior to any chromatic dispersion compensation. As shown in FIG. 1b, the chromatic dispersion is compensated using multipliers 219 and the chromatic dispersion estimate received from the microprocessor 221. As shown in FIG. 4, only 32 frequency bins k in the USB and LSB are used for each of the X and Y polarized signals. In an alternative implementation, all 128 frequency bins are used, however, use of only a fraction of the bins is sufficient to reliably extract the clock phase error and is also more computationally efficient. The selected frequency bins are centered at $\pm f_{baud}/2$ in order to maximize phase detector sensitivity, since as shown in FIG. 2, the received signal provides the greatest amount of data of the received signal over these frequency bins. Using an example of a 256 pt FFT and a sampling rate of two samples per symbol, $f_{baud}/2$ is at frequency bin index 64, and $-f_{baud}/2$ is at bin index 192 which is −64. The 32 bins in the x and y USB will have indices [−16:15]+64, and in the x and y LSB will have indices [−16:15]+192.

A circuit represented by block 401 calculates the dot products represented in Eqns. 8-11 for each of the 32 frequency bins above, denoted by Qxx,Qyx,Qxy,Qyy. The Qxx,Qyx, Qxy,Qyy vectors are calculated in block 401 for every clock cycle. As shown in FIG. 4, a second block 403 calculates the time average of each of these vectors over a desired number of clock cycles. Block 403 can be configured to compute the average values over a desired number of clock cycles such as 4, 8, 16, 32 or 64, or more, depending on the channel conditions and the desired receiver sensitivity. The choice of the number of averaging cycles depends on how much noise is in the channel and how fast the channel condition changes, such as a frequency transient of a clock jitter and PMD variations. In other words, the number of clock cycles used to compute the average should be chosen so that the conditions of the channel carrying the received signal is relatively static within the averaging time—this includes clock phase stability and polarization variations in the channel. Polarization variations can occur on the order of microseconds, thus it is desirable to calculate the time average in less than a microsecond which is easily achieved at the high sampling frequency of the receiver clock 234 of the exemplary receiver 200. For example, an exemplary receiver 200 can reliably recover a clock phase even when the signal is affected by a transient PMD value of 20 KHz in the channel, which equates to an averaging time of up to 2 microseconds. The variations in the clock phase, however, can occur much faster, thus additional consideration is taken to ensure the averaging occurs over a duration in which the clock phase also appears static. This will depend on the stability of the transmit clock or oscillator. Performing the averaging function over a larger number of clock cycles provides a more sensitive clock phase estimate. However, this necessarily increases the latency in the phase detector circuitry and thus limits the operating bandwidth. Accordingly, it is preferred to perform the averaging over as few clock cycles as necessary.

Block 405 calculates the determinant function on the averaged result and provides a value for each of the 32$\lambda[k]$. As shown in FIG. 1b, the phase detector circuitry 230, as represented in FIG. 4, operates on the received signal prior to compensating for chromatic dispersion. In the presence of large values of chromatic dispersion, the clock phase error represented in the equations $\lambda[k]$ may not result in reliable sensitivity of the clock recovery circuit. It was shown in the CD estimate application referenced above, however, that a reliable estimate for the chromatic dispersion can be calculated using the same expression λ[k]. Thus, as shown in FIG. 1b, it is preferred that the λ[k] values are provided to microprocessor 221 to estimate the value for chromatic dispersion. The microprocessor 221 preferably estimates the value for chromatic dispersion using the process disclosed in the CD estimate application. Microprocessor 221 then returns a value 'Δθ' to the phase detector circuitry 230, which represents a linear phase parameter of the estimated chromatic dispersion. The value 'Δθ' can be calculated from the expression in Eqn. 24 below. In Eqn. 24, the linear phase parameter 'Δθ' is related to the estimated dispersion value "CD[ps/nm]" as shown, where 'λ' is the signal wavelength in [nm], 'c' is speed of light 299,792,458 [m/s] and $f_{baud}$ is the baud rate in Hz.

$$\Delta\theta[\text{rad/Hz}] = \frac{CD[\text{ps/nm}] \cdot 10^{-24} \cdot}{\lambda^2[\text{nm}] \cdot 1000 \cdot 2 \cdot \pi \cdot f_{baud}[\text{Hz}]}{c} \quad (\text{Eqn. 24})$$

As shown in FIG. 4, the linear phase parameter 'Δθ' is used to filter the chromatic dispersion from the calculated λ[k] values output from block 405. The exemplary embodiment includes a multiplier 406 for mitigating the effects of chromatic dispersion on the clock recovery circuit using the expression $e^{j \cdot \Delta\theta \cdot k \cdot \Delta f}$ as shown. In this expression Δf measured in Hz is the frequency resolution of the implemented FFT blocks 215-1 and 215-2 and 'k' is the index of the frequency bin. In the example using a sampling rate of two samples per symbol, a 10G baud rate and 256 pt FFT, Δf[Hz] is calculated as $2 \times 10 \times 10^9/256 = 78.125$ MHz. As shown, single multiplier 406 is configured to filter each of the 32 outputs from block 405. This arrangement is advantageous in that it results in fewer filtering components required to reliably recover the clock phase in the presence of large chromatic dispersion. Less advantageous methods first filter the received signal to compensate for chromatic dispersion and then attempt to recover a clock phase. In such methods, the number of filtering components increases by a factor of 4, as a separate filter component would be used to filter each of the $_xUSB$, $_xLSB$, $_yUSB$ and $_yLSB$ signals shown in FIG. 4.

Circuit block 407 then determines the imaginary part for each of the dispersion compensated λ[k] values and sums the value over all 32 frequency bins. The output of circuit block 407 is a signed value that indicates a phase difference common to both the X-polarization signal components and the Y-polarization signal components, and is proportional to the clock phase error of the transmit clock (not shown). In step 513, the clock phase error value is passed to a conventional loop filter 232 which matches a tunable phase output from the voltage controlled oscillator 234 with the input phase information output from block 407 (step 515). The loop filter 232 can be a simple gain adjust multiplier which implements a first order loop based on a single gain multiplier according to a value proportional to the input phase information. For instance, the first order loop simply increases or decreases a voltage value proportional to the phase information to similarly tune the frequency of the voltage controlled oscillator VCO 234. Alternatively, the loop filter 232 implements the first order multiplier added in parallel with an integrator, forming a second order loop. The integrator in a second order loop forms a feedback loop to further compare the output voltage of the first order loop with the input phase information, thus more reliably controlling the VCO 234. The loop filter 232 is a standard component representing conventional delay-locked loops and phase locked loops and a variety of structures can be used. In step 517, the tunable VCO 234 adjusts the sampling phase of four ADC converter circuits 213 according the output of the loop filter 232.

In the receiver 200 shown in FIGS. 1a and 1b, the phase detector block 230 for performing the above functionality is preferably configured entirely in hardware within the DSP ASIC 211. The channel conditions, namely PMD and clock phase jitter, can change rapidly, thus the time averaging steps discussed above should be performed fast enough that the channel conditions appear to be static during this period. The hardware circuitry of the DSP ASIC 211 is suitable to perform the desired functionality at the desired speeds.

It has been shown above that the exemplary phase detector 230 is not sensitive to PMD states of the fiber channel and thus can be determined even for large values of DGD. For instance, using the above methods, an exemplary receiver 200 can reliably recover a clock signal even if the fiber channel imposes an instantaneous first order PMD value up to 200 ps, and an instantaneous second order PMD value up to 13,000 ps-squared. The exemplary clock phase detector 230 is only sensitive to a delay that is common to both X-polarization components and Y-polarization components of the received signal, which may represent the clock phase error of the transmit clock. As previously discussed, the exemplary method of estimating the clock phase is also insensitive to the chromatic dispersion in the channel in that the clock phase can be recovered without compensating for the chromatic dispersion effects directly from the received signal. Chromatic dispersion effects can be compensated from the clock phase estimates in the exemplary embodiments, using a chromatic dispersion estimate computed in the same calculations as the clock phase error. Thus, the exemplary methods according to this disclosure provide a distinct advantage over known systems by significantly reducing the time necessary to lock the receiver clock 234, especially since the receiver clock 234 can be synchronized without having to first compensate for the chromatic dispersion in the optical communication system directly on the received signal, which as discussed above can be time prohibitive for large values of chromatic dispersion. Additionally, compensating for the chromatic dispersion in the clock recovery circuitry reduces the complexity of the receiver circuitry since fewer filtering components are needed. The exemplary methods determine the value for the clock phase τ and a chromatic dispersion estimate simultaneously in the same calculation, thus it is not necessary to lock the clock recovery loop to determine the chromatic dispersion value, nor is it necessary to determine the chromatic dispersion value before locking the clock recovery loop. As discussed above in the background of this disclosure, previously known methods cannot accurately estimate the clock phase without first compensating for the chromatic dispersion in the received signal. Thus, the exemplary methods provide a clear advantage over conventional methods.

With respect to FIG. 1b, the microprocessor 221 uses the result of the determinant function λ[k] to calculate coefficients for the chromatic dispersion which are then provided to the multipliers 219. The output of multipliers 219 are then supplied to the function block 223 which performs a number of other DSP functions on the chromatic dispersion compensated signal, as shown in step 517. Some of the other exemplary DSP functions performed in block 223 are described in a paper contributed in part by the Applicants, the entire contents of which are incorporated herein by reference, titled *Performance of Dual-Polarization QPSK for Optical Trans-*

*port Systems*, published in the *Journal of Lightwave Technology*, Vol. 27, No. 16, Aug. 15, 2009.

With respect to FIGS. 1*a*, 1*b* and 4, it should be evident to one skilled in the art that any of the above-described hardware devices may be implemented as one or more software modules in order to perform the operations of the above-described embodiments. For instance, while the FFT circuits 215-1 and 215-2 are shown comprised in the DSP ASIC 211, these circuits may be realized in software alone, or a combination of software and hardware. Additionally, any of the described software components may also be realized in one or more hardware components for performing the desired functionality.

Other embodiments will be apparent to those skilled in the art from consideration of the specification. It is intended that the specification and examples be considered as exemplary only, with a true scope and spirit of the invention being indicated by the following claims.

What is claimed is:

1. A method comprising the steps of:
   receiving an optical signal;
   generating, from a plurality of outputs of a Fourier transform circuit, frequency domain data in response to time domain data associated with the optical signal;
   determining a first parameter based on components of the frequency domain data supplied from selected ones of the plurality of outputs of the Fourier transform circuit, said first parameter being indicative of a phase difference between selected ones of the plurality of components;
   filtering the first parameter to compensate for an estimated value of chromatic dispersion;
   determining a second parameter indicative of a clock phase of the optical signal based on said first parameter;
   using the second parameter to synchronize a receiver clock with the clock phase of the optical signal; and
   calculating an average value of the first parameter over a predetermined time period, wherein the time domain data has an associated baud frequency, and selected ones of the plurality of outputs of the Fourier transform circuit are associated with components of the frequency domain data that are spectrally spaced from one another by the baud frequency.

2. The method of claim 1, further comprising:
   generating an analog signal representative of the optical signal;
   sampling the analog signal at a sampling frequency controlled by the second parameter; and
   providing the time domain data in response to said sampling the analog signal.

3. The method of claim 2, wherein the sampling step further comprises:
   tuning a phase of the receiver clock according to the estimated clock phase; and
   sampling the received signal according to the phase of the tuned receiver clock.

4. The method of claim 1, wherein the first parameter corresponds to a dot product of first and second ones of the plurality of components of the frequency domain data.

5. The method of claim 1, wherein the step of determining the second parameter includes determining an imaginary part of the first parameter.

6. The method of claim 1, wherein the second parameter is not a function of a polarization mode dispersion of the received optical signal.

7. The method of claim 1, wherein the estimated value of chromatic dispersion is determined based on the first parameter.

8. A method comprising the steps of:
   receiving an optical signal;
   generating, from a plurality of outputs of a Fourier transform circuit, frequency domain data in response to time domain data associated with the optical signal;
   determining a first parameter based on components of the frequency domain data supplied from selected ones of the plurality of outputs of the Fourier transform circuit, said first parameter being indicative of a phase difference between selected ones of the plurality of components;
   filtering the first parameter to compensate for an estimated value of chromatic dispersion;
   determining a second parameter indicative of a clock phase of the optical signal based on said first parameter; and
   using the second parameter to synchronize a receiver clock with the clock phase of the optical signal,
   wherein the optical signal is a dual polarized optical signal having an X-polarization signal component and a Y-polarization signal component offset from each other by a first delay value, the first delay value being indicative of polarization mode dispersion, and the second parameter is determined from a delay value common to both the X-polarization signal component and the Y-polarization signal component such that it is not affected by the first delay value.

9. A receiver comprising:
   an analog-to-digital converter circuit configured to up-sample a received optical signal;
   a Fourier transform circuit comprising a plurality of outputs of frequency domain data in response to time domain data associated with the received optical signal output from the analog-to-digital converter circuit;
   a first module configured to determine a first parameter based on components of the frequency data supplied from selected ones of the plurality of outputs of the Fourier transform circuit, said first parameter being indicative of a phase difference between selected ones of the plurality of components;
   a second module configured to determine a second parameter indicative of a clock phase of the received optical signal based on said first parameter, wherein the second parameter is independent from a polarization mode dispersion effect on the received optical signal; and
   a circuit configured to adjust an oscillator according to the second parameter, wherein the oscillator controls the sampling of the analog-to-digital converter circuit, and wherein the first module is configured to calculate an average value of the first parameter over a predetermined time period, wherein the first parameter corresponds to a dot product of the first and second ones of the plurality of components of the frequency domain data, and the selected ones of the plurality of outputs of the Fourier transform circuit are associated with components of the frequency domain data that are spectrally spaced from one another by a baud frequency associated with the time domain data.

10. The receiver of claim 9, further comprising:
    a multiplier configured to filter an effect of chromatic dispersion from the first parameter.

11. The receiver of claim 10, wherein analog-to-digital converter circuit, the Fourier transform circuit, the first module, the second module, the circuit configured to adjust an oscillator, and the multiplier are each implemented in an application specific integrated circuit (ASIC).

12. The receiver of claim 10, further comprising a third module configured to determine an estimate for the effect of chromatic dispersion based on the first parameter.

13. The receiver of claim 12, wherein the third module is implemented in a microprocessor connected to the first module.

14. A receiver comprising;
- an analog-to-digital converter circuit configured to up-sample a received optical signal;
- a Fourier transform circuit comprising a plurality of outputs of frequency domain data in response to time domain data associated with the received optical signal output from the analog-to-diqital converter circuit;
- a first module configured to determine a first parameter based on components of the frequency data supplied from selected ones of the plurality of outputs of the Fourier transform circuit, said first parameter being indicative of a phase difference between selected ones of the plurality of components;
- a second module configured to determine a second parameter indicative of a clock phase of the received optical signal based on said first parameter, wherein the second parameter is independent from a polarization mode dispersion effect on the received optical signal; and
- a circuit configured to adjust an oscillator according to the second parameter,
- wherein the oscillator controls the sampling of the analog-to-digital converter circuit, and wherein the second module is configured to determine the second parameter based on a sum of an imaginary part of the first parameter for each of the selected ones of the plurality of components.

* * * * *